No. 897,487. PATENTED SEPT. 1, 1908.
C. H. PRESCOTT.
MACHINE FOR MOLDING BUTTER.
APPLICATION FILED DEC. 4, 1907.
2 SHEETS—SHEET 2.
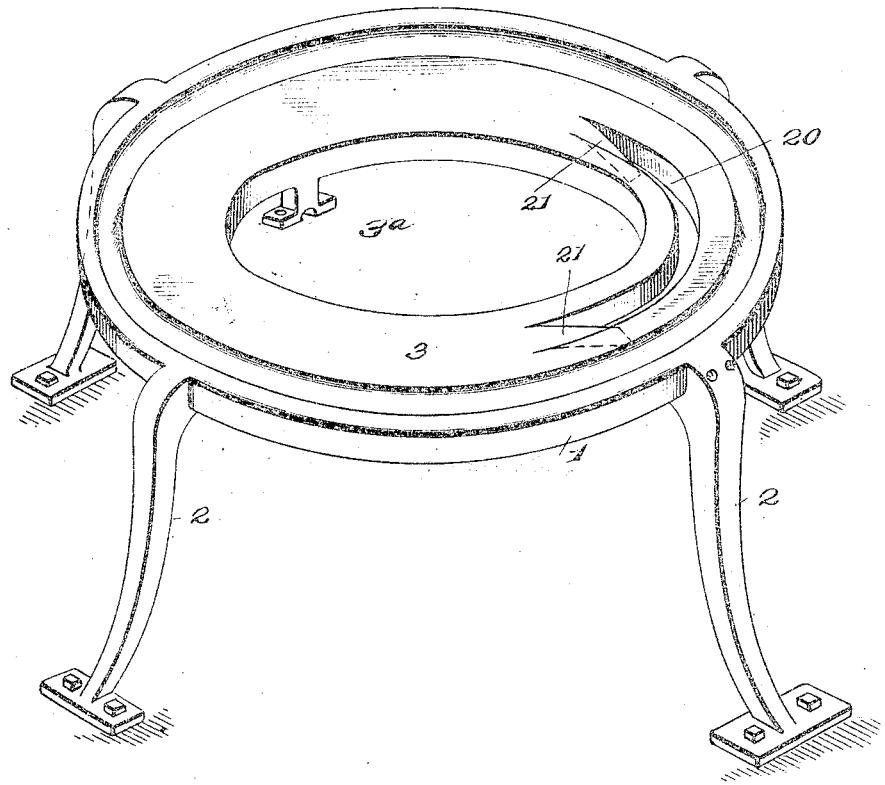
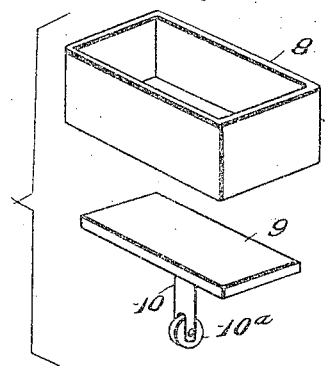

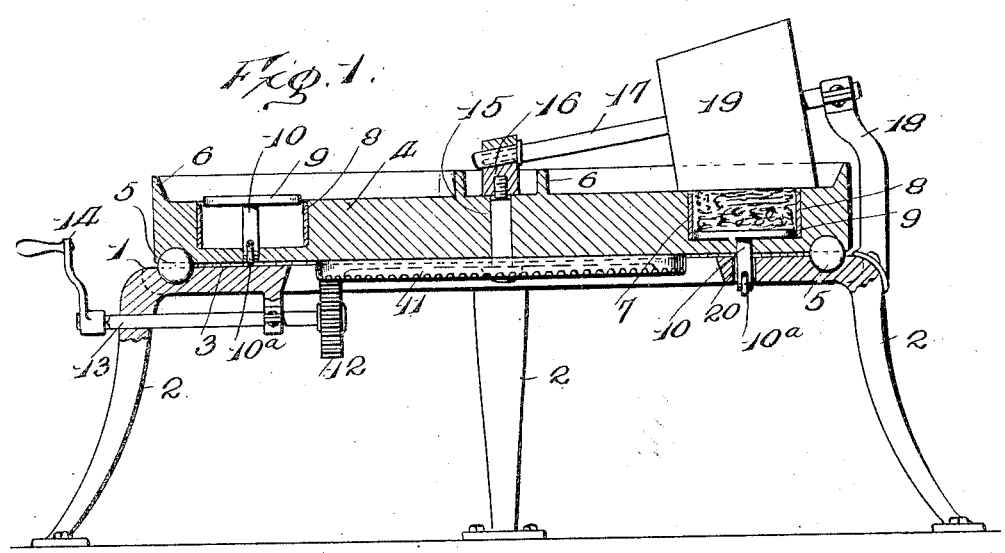
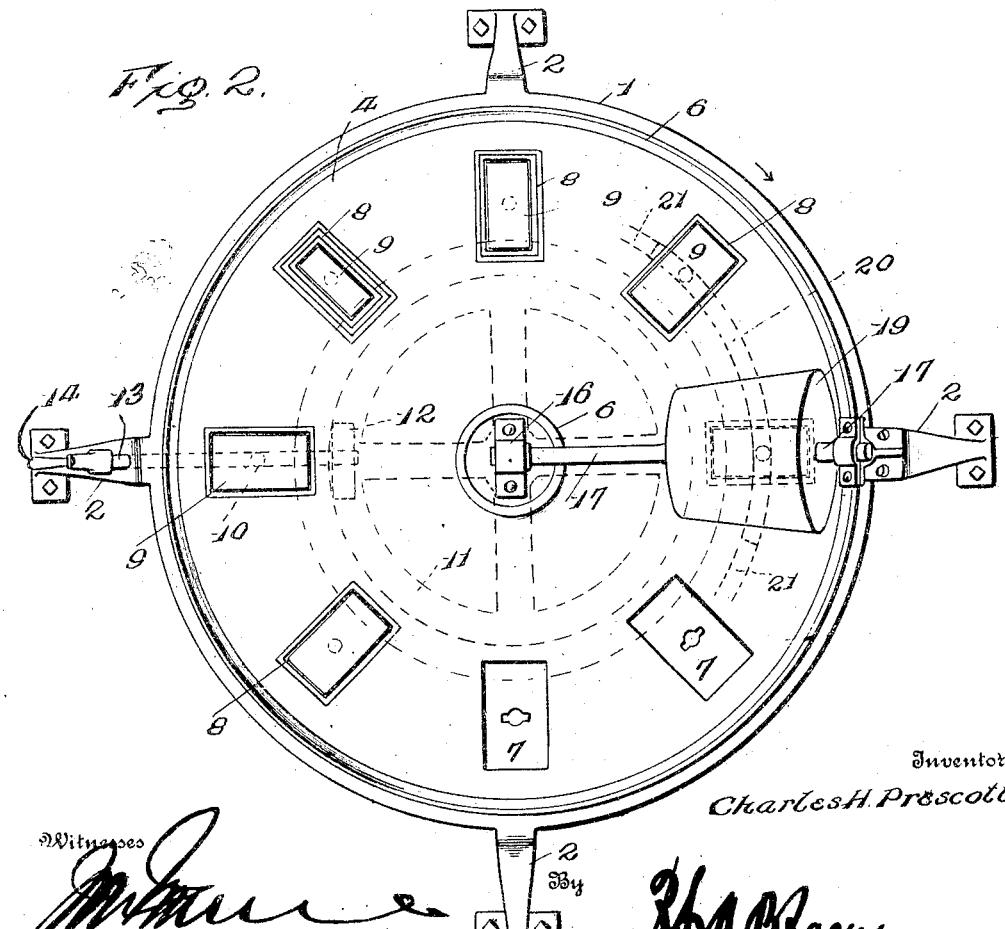

UNITED STATES PATENT OFFICE.

CHARLES H. PRESCOTT, OF EAST LIVERPOOL, OHIO, ASSIGNOR OF ONE-HALF TO JAMES E. DAVIS, OF EAST LIVERPOOL, OHIO.

MACHINE FOR MOLDING BUTTER.

No. 897,487.　　　Specification of Letters Patent.　　　Patented Sept. 1, 1908.

Application filed December 4, 1907. Serial No. 405,055.

*To all whom it may concern:*

Be it known that I, CHARLES H. PRESCOTT, a citizen of the United States, residing at East Liverpool, in the county of Columbiana and State of Ohio, have invented certain new and useful Improvements in Machines for Molding Butter, of which the following is a specification.

This invention comprehends certain new and useful improvements in machines for molding and printing butter, and the invention has for its object a simple, durable and efficient construction of machine of this character, which is practically automatic and by which butter may be molded into "prints" or cakes of any desired size ready for the market, as rapidly as the butter is supplied to the machine.

With this and other objects in view as will more fully appear as the description proceeds the invention consists in certain constructions and arrangements of the parts that I shall hereinafter describe and then point out the novel features in the appended claims.

For a full understanding of the invention, reference is to be had to the following description and accompanying drawings, in which:

Figure 1 is a side elevation of my improved butter molding machine showing parts in section. Fig. 2 is a top plan view thereof. Fig. 3 is a perspective view of the supporting frame work of the machine. Fig. 4 is a detail perspective view of one of the molds with its pallet detached therefrom and in juxtaposition thereto.

Corresponding and like parts are referred to in the following description and indicated in all the views of the drawings by the same reference characters.

Referring to the drawings the numeral 1 designates the frame-work of my improved butter molding machine, said frame-work embodying legs 2 and an inwardly extending annular bed 3 with a central opening 3ª, the upper surface of said bed forming a support for the revoluble mold block or carrier 4. Preferably anti-friction balls 5 are interposed between the frame and the mold carrier 4, to maintain the parts in proper alinement during the revolution of the mold carrier and to minimize friction, the said balls traveling in annular grooves formed in the opposing face of the mold carrier and bed. The mold carrier 4 is preferably in the form of a block as shown and may be built of several layers of hard wood such as maple or composed of any other substance or material suitable for the purpose, and is provided preferably with inner and outer upright rims 6, as clearly illustrated in the drawings. The mold carrier 4 is formed with any desired number of openings 7, preferably radially disposed as shown, said openings being designed to receive the molds 8, which may be nested one inside of the other, to produce a mold of the desired size, that is, for forming a cake or print of butter of the desired size and shape. A plurality of pallets 9 are provided for the different molds 8 and may be formed with any configuration so as to produce an impression on one side of the block of butter as it is formed. If desired these detachable pallets 9 may be secured to the pins 10 by loose dowel connection. The pins 10 are designed to project downwardly through the mold carrier 4 and are provided at their lower ends with rollers or casters 10ª.

A circular rack 11 is secured to the lower face of the mold carrier 4, and a pinion 12 meshes with the rack as shown. This pinion is carried on one end by a shaft 13 which is horizontally disposed and which is provided at its outer end with the hand crank 14. The circular rack 11 is secured to the lower side of the mold carrier 4 by means of a pin 15 extending upwardly therethrough inside of the inner rim 6. A shaft bearing 16 is formed on the upper end of the pin 15, and a shaft 17 is journaled at one end in said bearing and is journaled at its outer end in a bearing formed in the upper end of a bracket 18 secured to the frame 1. The shaft 17 is preferably held in an inclined position, and a tapered roller 19 is mounted thereon. The bed 3 of the frame is formed near the roller 19 with a slot 20 in registry with the series of pins 10 of the pallets 9, so that as the mold carrier 4 is revolved, the pins in succession will drop downwardly through the slot so as to lower the pallet for the reception of the butter. As the mold carrier continues to revolve, the butter will be packed in the mold cavity by the roller 19 and smoothed, and after passing the roller, the depending end of the pins 10 will ride upon the cam 21 formed in the frame-work, to effect a rising movement of the pallet with the block of butter on it, to discharge the completed article from the mold.

From the foregoing description in connection with the accompanying drawings, it will be seen that I have provided a very simple and efficient construction of butter molding machine, which may be used to quickly form the butter and print the same ready for the market, and in the desired sizes, it being understood that the pins 10 will ride along the bed 3 throughout the major portion of their traverse, and will drop through the slot 21 just before reaching the roller 19, to lower the pallets and permit the butter to fill the mold.

Having thus described the invention, what is claimed as new is:

1. A machine of the character described, comprising a supporting framework embodying an annular bed with a centrally located opening extending therethrough, a mold carrier mounted to rotate on said bed, said carrier being provided with one or more cavities for the reception of butter, a shaft supported in the framework above the mold carrier, a roller mounted on said shaft and adapted to engage the outer surface of the mold carrier as it rotates underneath the roller, a circular rack secured to the bottom of the mold carrier within the central opening of the bed, and a driving shaft journaled underneath the bed and provided at its inner end with a pinion meshing with said rack.

2. A machine of the character described, comprising a framework embodying an annular bed having a centrally located opening extending therethrough, a mold carrier mounted to rotate on said bed and formed on its upper face with an inner and an outer rim, said mold carrier being provided with one or more mold cavities, pallets mounted in the mold cavities, means for automatically raising the pallets, and permitting them to lower during the rotation of the mold carrier, a pin projecting upwardly through the center of the mold carrier and within the circle of the inner rim, a shaft bearing secured to the upper end of said pin, a bracket secured to and projecting upwardly from the framework, a shaft journaled in said bearing and said bracket, a roller mounted on said shaft and adapted to smooth the material in the mold cavities as the mold carrier rotates, a rack secured to said pin and lying against the lower face of the mold carrier within the opening of the bed, and a driving shaft journaled underneath the bed and provided at its inner end with a pinion meshing with the teeth of said rack.

3. A machine of the character described, comprising a supporting framework embodying an annular bed formed with a centrally located opening and an annular upwardly facing groove, a mold carrier provided with one or more mold cavities formed in its lower face with an annular groove, registering with the groove of the bed, friction balls interposed between the bed and mold carrier and adapted to travel in said grooves, whereby to mount the carrier for rotation on the bed, pallets mounted in the mold cavities, means for raising said pallets in the cavities and for permitting them to lower during the rotation of the carrier, a roller supported above the carrier and adapted to engage therewith for the purpose specified, a circular rack secured to the lower ends of the carrier within the opening of the bed, and a driving shaft journaled underneath the bed and having a driving connection with said rack.

In testimony whereof I affix my signature in presence of two witnesses.

CHARLES H. PRESCOTT. [L. S.]

Witnesses:
 D. F. WHITE,
 H. G. McDADE.